United States Patent [19]

Engemann et al.

[11] Patent Number: 4,531,062
[45] Date of Patent: Jul. 23, 1985

[54] DOCUMENT SCANNING APPARATUS

[75] Inventors: Detlef Engemann, Oberursel; Dieter Fischer, Frankfurt; Heinz Kleeberg, Nuremberg, all of Fed. Rep. of Germany

[73] Assignee: Triumph-Adler Aktiengesellschaft fur Buro- und Informationstechnik, Nuremberg, Fed. Rep. of Germany

[21] Appl. No.: 442,017

[22] Filed: Nov. 16, 1982

[30] Foreign Application Priority Data

Nov. 20, 1981 [DE] Fed. Rep. of Germany ....... 3145952

[51] Int. Cl.³ .............................................. H01J 40/14
[52] U.S. Cl. ................................ 250/578; 250/237 R; 358/213
[58] Field of Search ................... 250/578, 211 R, 216, 250/211 J, 566, 237 R; 358/212, 213; 350/449

[56] References Cited

U.S. PATENT DOCUMENTS 3,544,713 12/1970 Case et al. ........................... 250/211
4,430,564 2/1984 Fisher ................................ 250/211 R Primary Examiner—David C. Nelms
Assistant Examiner—R. Eyssallenne
Attorney, Agent, or Firm—Joseph R. Spalla

[57] ABSTRACT

An optical document scanning apparatus of high resolution employs diaphragms defined by a line array of spaced opaque areas which are located midway between an object plane and an image plane containing a line array of spaced light sensors. The object plane is illuminated from a light source located in the image plane parallel to said line array of light sensors. The distance between object and image planes is twice the distance from the lead edge of one light sensor to another and the opaque areas defining the diaphragms are located opposite the areas between light sensors to restrict exposure of the light sensors substantially only to light diffusely reflected from the object plane which is normal to the light sensors thereby to achieve high resolution.

3 Claims, 7 Drawing Figures

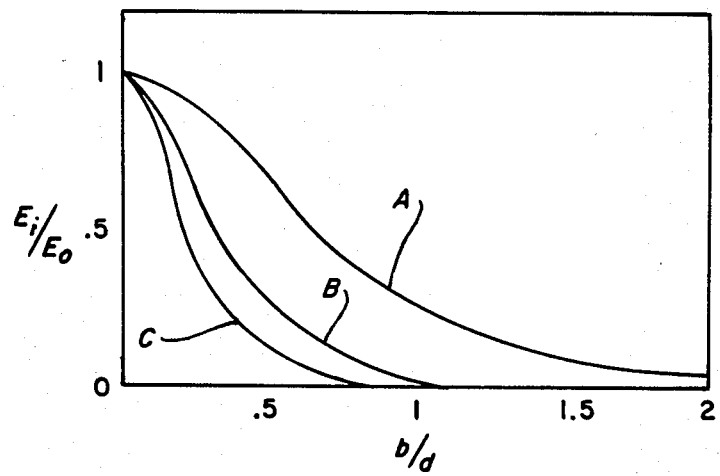
Fig_1
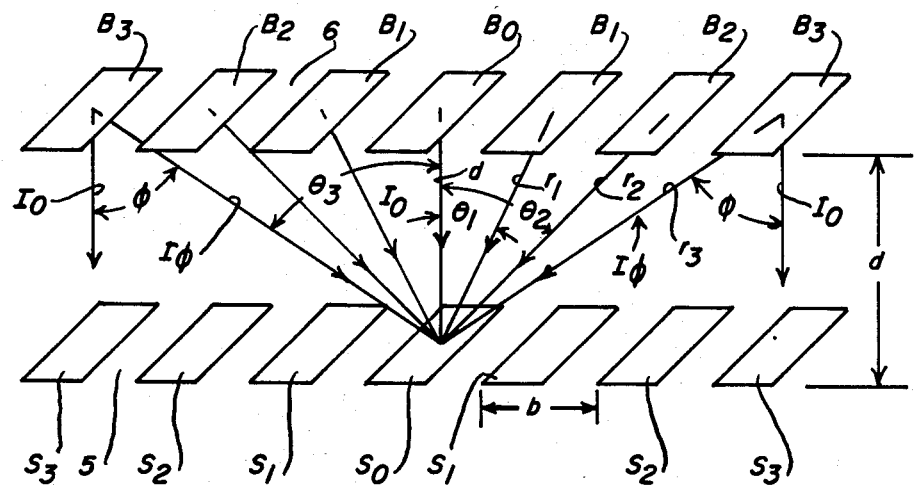
Fig_2
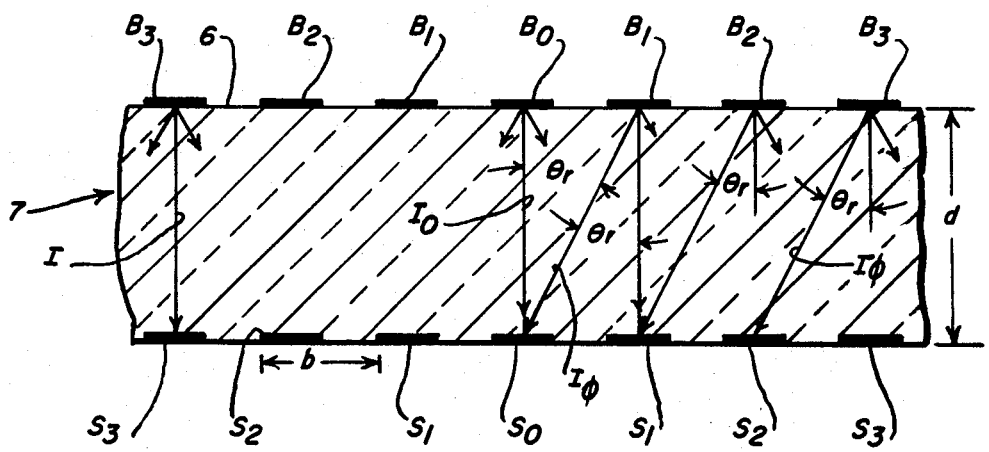
Fig_2A

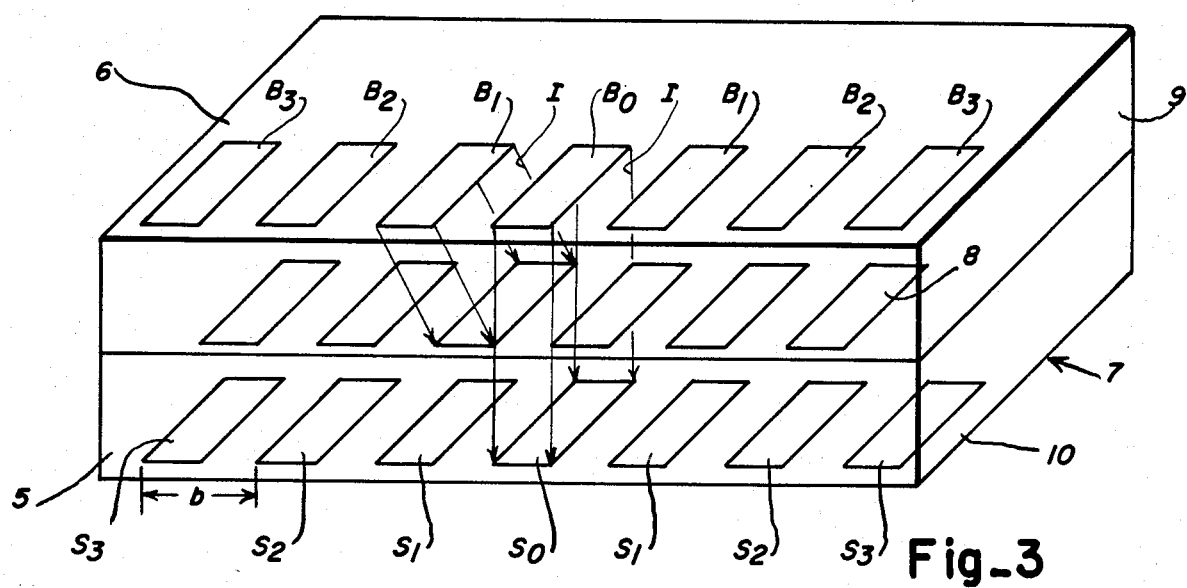
Fig_3
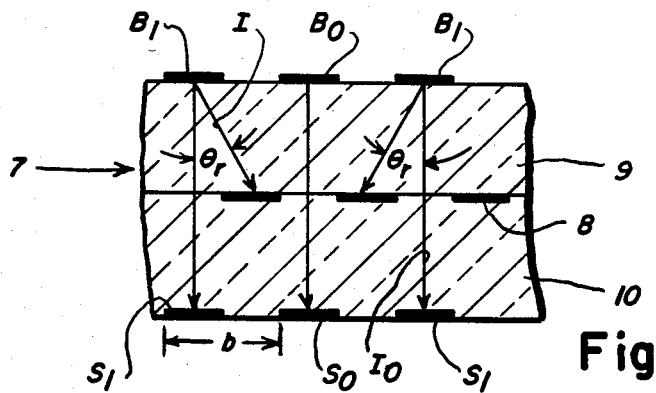
Fig_3A
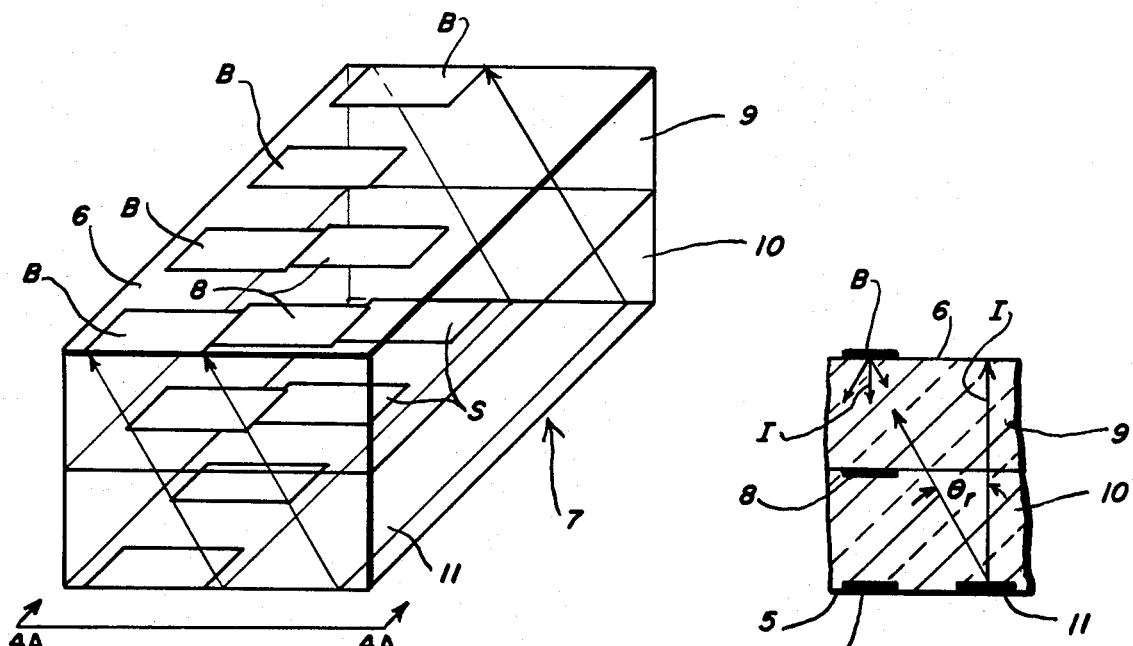
Fig_4
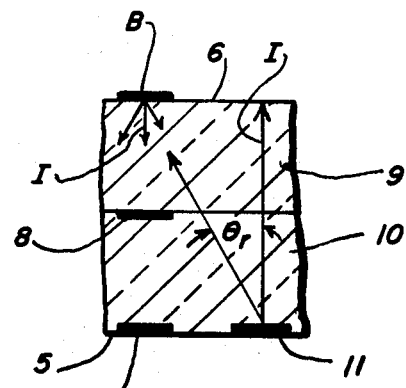
Fig_4A

DOCUMENT SCANNING APPARATUS

This invention relates to a lensless high resolution document scanning apparatus; more particularly it relates to such a scanning apparatus having a line array of spaced light sensors in an image plane which is closely spaced from an object plane and having a light source in the image plane for illuminating the object plane; and specifically it relates to such a scanning apparatus having diaphragms located midway between the object and image planes positioned to limit exposure of the light sensors substantially only to light diffusely reflected from the object plane which is normal to the light sensors.

Line by line scanning of documents can be done with the aid of a linear array of image sensors in association with a shift register. Such image sensor arrays are known in the form of charge coupled devices (CCDs) with up to 1,728 or 2,048 devices in a line array having a length on the order of 25 mm to accommodate devices whose individual size is on the order of 12 microns. With such a CCD array, a standard DIN A4 size paper, 210 mm wide, can be scanned with a resolution of from 8-10 points per millimeter. However, due to the smaller length of a CCD array relative to the width of A4 paper, an optical system to reduce the width of the paper to the length of the CCD array becomes necessary. Such optical systems must have very good reproduction properties; edge blurs must not occur. Lenses having these properties are not only relatively complicated and expensive to make, they require a design of large dimensions because of the distance necessary between object plane and lens and between lens and image plane.

If an image sensor array is constructed so that the image sensors are the same size as individual points in an object plane, e.g., sensors spaced at a center to center distance of 0.1 mm, an optical system is not necessary provided object plane and image plane are brought into closely spaced relationship with one another. However, due to receipt by one point on the image plane of light reflected not only from an opposite point in the object plane but also from points adjacent to the opposite point in the object plane, image contrast is lost.

In co-pending application Ser. No. 271,620, filed June 8, 1981, now U.S. Pat. No. 4,430,564 the disclosure of which is incorporated by reference herein, an arrangement is disclosed to achieve unambiguous correlation between a light sensor in the image plane and an opposite point in an object plane through the use of glass fiber light guides of finite length. As disclosed in said co-pending application, the fiberglass light guides are installed in an intermediate layer between object plane and image plane thereby to guide light reflected from the object plane to directly opposite points in the image plane. Such a light guide arrangement which is embedded in a glass plate defining the distance between object and image planes presents difficulty in production involving fabrication of the glass fibers and their precise installation in the glass layer.

In accordance with the invention, a linear array of light sensors in an image plane, spaced according to the resolution desired, e.g., 10 light sensors/mm, are closely spaced from a parallel object plane. The distance between the object and the image plane is, according to the invention, twice the distance from the lead edge of one light sensor to that of another in the array. To achieve high resolution there are provided diaphragms defined by opaque areas which are so positioned midway between the closely spaced object plane and image plane that light diffusely reflected from the object plane only reaches an oppositely located light sensor in the image plane. The diaphragms are located in a plane midway between the object and image planes by establishing the distance between object and image planes by the use of two glass plates each having a thickness one-half the distance between object and image planes. Preferably the opaque areas defining the diaphragms are formed by photolithographic techniques on one of the glass plates which are then joined by means of a suitable adhesive whose index of refraction is substantially that of glass. In accordance with the invention, the opaque areas defining the diaphragms are located opposite, and are equal in area, to the areas between light sensors in the image plane.

An object of the invention is to provide a compact lensless high resolution arrangement for line scanning a document to be reproduced.

Another object of the invention is to provide an arrangement for scanning a document in which light sensors in an image plane receive only light diffusely reflected from opposite points on a document in an object plane.

Another object of the invention is in the provision of a 1:1 image converter wherein diaphragms defined by spaced opaque areas are located between object and image plane to restrict exposure of light sensors in the image plane only to light reflected at substantially right angles from opposite areas in an illuminated object plane.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

FIG. 1 are curves plotting $E_i/E_o$ versus b/d.

FIGS. 2 and 2a are perspective and elevational views depicting diagramatically an image plane containing several of a line array of spaced light sensors located at a distance d from a parallel object plane supporting a document opposite the light sensors.

FIGS. 3 and 3a are perspective and elevational views from a different aspect as that shown on FIGS. 2 and 2a showing diaphragms intermediate the object and image planes; and FIGS. 4 and 4a are perspective and elevational views similar to FIGS. 3 and 3a rotated 90° to show the course of light directed to the object plane from a light source in the image plane.

With reference to FIG. 2, there is shown a portion only of a line array of light sensors individually designated, for purpose of description, $S_1$, $S_2$, $S_3$-$S_n$ (not shown) extending to either side of a light sensor designated $S_o$. The line array of light sensors resides in an image plane 5 spaced a distance d from an object plane 6 containing document areas, designated $B_1$, $B_2$, $B_3$-$B_n$ (not shown), extending to either side of a document area designated $B_o$, with designated document areas $B_o$, $B_1$, $B_2$, $B_3$ opposite correspondingly designated light sensors. As shown in FIGS. 2 and 2a, b is the distance from the lead edge of one light sensor to that of another. The illumination impinging on a given light sensor, e.g. the light sensor designated $S_o$, is from light diffusely reflected from opposite document area $B_o$ and light diffusely reflected from neighboring document areas $B_1$, $B_2$, $B_3$ to either side of document area $B_o$.

With reference to FIGS. 2 and 2a the illumination $E_o$ impinging at right angles onto a given light sensor $S_o$ from an opposite document area $B_o$ is a function of the light intensity $I_o$ diffusely reflected at a right angle from the document area $B_o$ divided by the square of the distance between $B_o$ and $S_o$ or $E_o = I_o/d^2$.

The illumination $E_i$, i designating light from document areas neighboring $B_o$, impinging at an angle theta to the vertical on a given light sensor $S_o$ from each of neighboring document areas $B_1$, $B_2$, $B_3$–$B_n$ is a function of the intensity of light diffusely reflected at an angle Phi to the vertical from a neighboring document area times the cosine of the angle theta divided by the distances r squared from neighboring document areas $B_1$, $B_2$, $B_3$ to given light sensor $S_o$ or $$E_i = I_\phi \cos\theta/r^2$$

and since $I_\phi = I_o \cos\theta$, $$E_i = I_o \cos\phi \cos\theta/r^2.$$

With angle $\phi$ = angle $\theta$, $$E_i = I_o \cos^2\theta/r^2.$$

In FIG. 1, there are shown plots of $E_i/E_o$ or $\cos^2\theta d^2/r^2$ against b/d. Curve A plots $E_i/E_o$ where $E_i$ is the illumination received by light sensor $S_o$ from light of intensity $I_o$ reflected from a neighboring document area $B_1$ adjacent $B_o$; curve B from a neighboring document area $B_2$, and curve C from a neighboring document area $B_3$.

The curves illustrate that as b/d increases (b increases or d gets smaller), light incident on given light sensor $S_o$ from illuminated document areas B farther away from $B_o$ decreases. Thus, as shown in FIG. 1 where b/d is one, light incident on $S_o$ from document area $B_1$ next to $B_o$ (curve A) contributes approximately 25%, or a total of 50% from document area $B_1$ to either side of document area $B_o$. At b/d equal to one, light incident on light sensor $S_o$ from document area $B_2$ (curve B) and from document area $B_3$ (curve C) is significantly less or zero, respectively.

If, therefore, a document area, e.g., $B_o$ is dark and adjacent neighboring document areas $B_1$ are bright, a given light sensor $S_o$ receives 50% of light incident thereon from adjacent document areas $B_1$. This means intermediate shading values to about 50% cannot be resolved. Even where only strong black to white contrasts are to be reproduced, even slight intensity fluctuations preclude reproduction of small document areas.

As evident from the curves in FIG. 1, contrast may be improved if b/d is significantly greater than 1, i.e., d smaller than b. If a resolution of 10 light sensors per millimeter, e.g. b=100 microns, is desired, the distance d would have to be significantly less than 100 microns to achieve improved contrast. This means that if a glass spacer 7 between object and image planes is used to establish the distance d between object and image planes it must be thinner than 0.1 mm or 100 microns. Such thin glass layers have little mechanical stability and are not practical.

With reference to FIGS. 2 and 2a, a glass spacer 7 having an index of refraction greater than 1 is shown between image planes 5 and 6. It will be appreciated that, as seen by a given light sensor, $S_o$, light reflected from document areas $B_n$, farthest away from $B_o$, at the greatest angle $\theta$, approaching 90°, will be refracted in the glass toward the vertical away from the path to light sensor $S_o$. With the object and image planes separated by a glass spacer of thickness d and having an index of refraction $\mu$ on the order of 1.5, the rays reflected from document areas $B_2$, $B_3$, $B_n$ at the greatest angle $\theta_i$ will be refracted in the glass spacer 7 and transmitted through the glass spacer 7 to the image plane 5 at an angle $\theta_r$ (angle of refraction) of less than 42 degrees as calculated according to the formula $\mu = \sin\theta_i/\sin\theta_r$. Accordingly, with a given d and b/d less than 1, light from document areas $B_2$–$B_n$, as seen from a light sensor $S_o$, due to refraction, cannot reach the light sensor $S_o$.

Thus, only light reflected from document areas $B_1$ at a ratio of b/d less than 1 can reach a light sensor $S_o$. Light from document areas $B_1$ due to refraction, will also be reduced from the values shown in FIG. 1 to approximately 40%. However, even this amount of light from document areas $B_1$ prevents reproduction of gray scales.

In accordance with the invention, d is designed to be twice b and the length of a light sensor S is selected to be on the order of 100 times the wavelength of light used in the visible region to render diffraction effects negligible. Thus the length of a sensor with b=100 microns can, for example be b/2, at 0.5 micron wavelengths Further in accordance with the invention and as shown in FIGS. 3 and 3a, light diffusely reflected from adjacent document areas $B_1$ as would fall on a given light sensor $S_o$ in an image plane 5 spaced a distance d from the object plane 6 which is twice b, e.g., a ratio b/d of 0.5, is suppressed to a large extent by installing diaphragms formed by spaced opaque areas 8 between the object and image planes. The diaphragms as illustrated in FIG. 3 are located midway between the object and image planes 5 and 6 and with the opaque areas 8 thereof opposite the areas between light sensors. At a distance d, e.g., of 200 microns and b=100 microns, i.e., a b/d ratio of 0.5, the provision of diaphragms restricts light from document areas $B_1$ from reaching sensor $S_o$. Light reflected from squares $B_2$–$B_n$ due to refraction, as noted hereinbefore, does not reach $S_o$.

A distance of 200 microns is best achieved by a laminated spacer 7 formed by adhesively bonding two layers 9 and 10 each of 100 microns, the lamination providing a significantly more mechanically stable spacer 7. Before bonding, one of the glass layers 9 or 10 is treated by a photolithographic process to form the opaque areas defining the diaphragms. The bonding agent is also preferably of a material having the same index of refraction as the glass layers 9 and 10 to minimize refraction losses. Differences in index of refraction on the order of 0.1 produce only insignificant losses. Thus at an index of refraction of 1.5, a difference in index of refraction of 0.1 causes, at perpendicular or normal incidence, a refraction of 0.12% per interface. This loss increases only insignificantly to 0.13% at angles of incidence up to 30°.

Thus, with the aid of diaphragms, a linear array of light sensors for line scanning documents can be accommodated together with a source 11 (FIG. 4) of illumination in the image plane 5 in a small space.

As will be appreciated, with a linear array of spaced light sensors only a limited range of angles is available for illumination of the closely spaced object plane 6. The range is limited by reflection at interfaces and by the ratio b/d, as light must be guided laterally past the array of light sensors toward the object plane 6. The diaphragms of the invention here offer advantages as they permit making the distance d relatively greater than b which leads to a reduction in the angle of incidence at the object plane 6 which reduces reflection losses. As the diaphragms are arranged opposite areas between light sensors, they do not impair illumination of the object plane 6.

FIGS. 4 and 4a are views similar to FIGS. 3 and 3a, but rotated 90° to illustrate the light source 11 for illumination of the object plane 6 as comprising a light panel in the image plane 5 parallel to the line array of light sensors.

In the example given with d=200 microns, a spacing on the order of 50 microns between the light source 11 and the light sensor array, permits edge rays from the source to impinge on the glass object plane interface at an angle of refraction of under 32°.

The invention claimed is:

1. Lensless apparatus for line scanning an original document moving relative to an object plane comprising a line array of light sensors located in an image plane and spaced from one another by a predetermined distance, a light panel in said image plane parallel to said line array of light sensors for illuminating said object plane whereby light is reflected from said document onto said light sensors, a light transmitting medium between said object and image planes having a thickness which is twice the distance from the lead edge of one light sensor to that of another light sensor, and diaphragms defined by opaque areas located in said light transmitting medium in a plane midway between and parallel to said object and image planes, said opaque areas being equal in dimension to and opposite areas between said light sensors for limiting exposure of said light sensors substantially to reflected light normal to said light sensors.

2. Apparatus as recited in claim 1, said light transmitting medium being formed by two glass layers of equal thickness adhesively secured together, said opaque areas being located between said layers.

3. Apparatus as recited in claim 2, one of said glass plates being etched to define said opaque area.

* * * * *